US005121568A

United States Patent [19]
Lindmeyer

[11] Patent Number: 5,121,568
[45] Date of Patent: Jun. 16, 1992

[54] AUDIBLE FISHING ATTRACTOR

[76] Inventor: James Lindmeyer, 705 N. Main St., Hutchinson, Minn. 55350

[21] Appl. No.: 644,533

[22] Filed: Jan. 23, 1991

[51] Int. Cl.⁵ .............................................. A01K 85/00
[52] U.S. Cl. .................................. 43/42.31; 43/42.36
[58] Field of Search .................. 43/42.31, 44.9, 44.91, 43/42.39, 42.19, 42.36

[56] References Cited

U.S. PATENT DOCUMENTS

| | | | |
|---|---|---|---|
| 2,741,864 | 4/1956 | Shotton | 43/42.31 |
| 2,763,954 | 9/1956 | Bunker | 43/42.31 |
| 3,885,340 | 5/1975 | Volenec | 43/42.31 |
| 3,909,973 | 10/1975 | Fairbanks | 43/42.31 |
| 4,015,363 | 4/1977 | Sedlak | 43/42.31 |
| 4,435,914 | 3/1984 | Norman | 43/42.31 |
| 4,703,579 | 11/1987 | Kay | 43/42.19 |
| 4,747,228 | 5/1988 | Giovengo | 43/42.31 |
| 4,791,750 | 12/1988 | Gammill | 43/42.31 |
| 4,969,287 | 11/1990 | Johnson | 43/42.31 |
| 4,995,189 | 2/1991 | Crihfield | 43/42.31 |

Primary Examiner—Kurt Rowan
Attorney, Agent, or Firm—D. L. Tschida

[57] ABSTRACT

A multi-section hollow sound chamber containing a plurality of beads and including bore holes or a tubular mounting bore, which is isolated from the sound chamber, for supporting the chamber from a fishing line, wire-form or lure. Associated buoyancy and rotation means facilitate auditory sounds. In various constructions, the chamber parts mount in mated and bonded relation about a hook shank, a wire-form coupling member or a fishing line. Included fins or external grooves facilitate chamber rotation with movement relative to water.

15 Claims, 6 Drawing Sheets

AUDIBLE FISHING ATTRACTOR

BACKGROUND OF THE INVENTION

The present invention relates to audible fishing lures and, in particular, to a sound chamber mountable in a variety of fishing presentations, including weighted head jigs, crank baits, or snells.

It is generally known that various fish species at various times respond to auditory stimulation. Although the conditions when such stimulus has the greatest effects are not fully understood, varieties of lure presentations have been developed in recent times which include sound chambers wherein a plurality of metal beads are contained. The motion of such lures, induces random interaction of the beads within an integral body chamber to create a rattle type of sound. Typically, such lures comprise a molded plastic body, usually in the form of a prey food species, wherein the body parts are hollowed to contain a plurality of the bead members. Termination means are included with such bodies for securing hooks and/or a line to the lure.

Applicant is aware of a variety of lure presentations which include detachable sound chambers which may be added to a lure presentation. One such chamber comprises a hollow, bead-containing spinner blade; others comprise chambers which are insertable within provided pockets in the lure body or directly into soft bodied lures molded to the form of worms or the like. Applicant is also aware of lead head jig presentations which include a chamber mounted with rubber bands to the hook shank and which include a chamber that is molded into the weighted head to extend in parallel displaced relation to the hook shank.

Applicant is further aware of a bullet-shaped chamber including a plurality of beads which includes a coextensive bore for mounting about a fishing line to slide to and fro therealong. The chamber, however, is constructed to act as a ballast or weight for the lure presentation.

Nowhere is applicant aware of an accessory sound chamber which is intended to mount directly about a hook shank, which is intended to provide a neutral or positive buoyancy to the lure, which includes further means to induce to and fro motion on a wire or line support or rotation of the chamber thereabout relative to lure travel through water.

SUMMARY OF THE INVENTION

Accordingly, applicant has developed a modular auditory sound chamber which is mountable to a variety of lure presentations relative to a longitudinally coaxial support member and to which support member the chamber is either rigidly or rotatively, slideably secured.

It is a further object of the invention to provide a multi-section chamber including shaped portions having indexable, mating edges whereby in combination a hollow cavity is formed, upon assembly and bonding.

It is a further object of the invention to provide a chamber including bore holes or a bore tube having a core which is isolated from the hollow chamber interior and beads.

It is a further object of the invention to provide external surface grooving along external surfaces of the chamber walls or projections therefrom which induce a rotation of the chamber about a coaxial support, which may comprise a hook shank, wire-form or snell line.

It is a further object of the invention to provide a neutral to positively buoyant sound chamber.

It is a still further object of the invention to provide a chamber including an integral coaxial wire-form support, whereby the chamber may be selectively attached to various lure presentations.

Various of the foregoing objects, advantages and distinctions of the invention will become more apparent hereinafter with reference to the following appended drawings and related description and wherein a variety of chamber constructions are shown.

In one construction, a two-part chamber is sonically bonded to the shank of a hook. The chamber is secured either in stationary or rotative relation to the hook shank, which may additionally include a weighted forward head or other filamentary attractors or barb protectors.

In various other constructions, the chamber includes finned projections or surface grooves which relative to movement through water induce rotation and an audible reaction of the contained beads.

In yet other embodiments, a filamentary, coaxial line or wire-form attachment means is secured through the chamber and whereby the chamber may be secured to other lure body components.

Still other objects, advantages and distinctions of the invention will become more apparent from the following detailed description with respect to the appended drawings. Before referring thereto, it is to be appreciated the following description is intended to be illustrative only of various presently considered constructions. Accordingly, the disclosure should not be strictly interpreted. To the extent modifications and/or improvements have been considered they are described as appropriate.

DESCRIPTION OF THE PREFERRED EMBODIMENT

Figure 1:
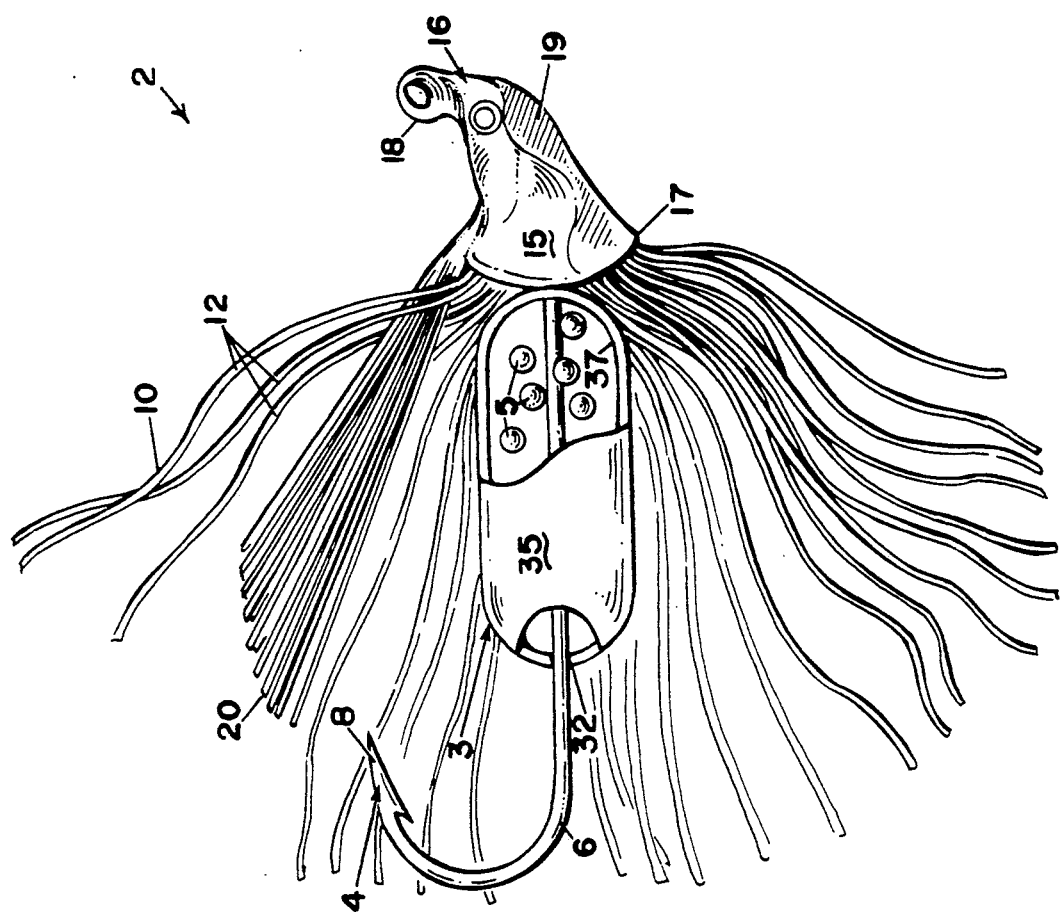
FIG. 1 shows a drawing in partial cutaway of a lead head jig including a shank mounted sound chamber.

Referring to FIG. 1, a partially sectioned isometric view is shown of a fishing jig 2 which includes an audible sound chamber 3 containing a plurality of beads 5. The jig 2 is principally comprised of a barbed fishing hook 4 which includes a suitably sized shank portion 6 and spacing between a barb 8 and the shank 6 to accommodate the audible chamber 3. That is, the diameter and length of the chamber 3 relative to the hook 4 is typically sized such that a gap remains between the hook barb 8 and the chamber 3 to permit the setting of the hook into the mouth of a striking fish, as opposed the chamber obstructing the hook set. The chamber 3 may also be secured in either rigid or slideable/rotative relation to the hook shank 6. For the embodiment of FIG. 1, the chamber is rigidly bonded to the hook shank 6.

Positioned forward of the chamber 3 is a filamentary skirt 10 including a plurality of tentacles 12 which project rearward. In the alternative jig of FIG. 4 a closed, thin-walled umbrella or parachute like skirt 14 is shown and which might be included in lieu of the skirt 10. More of the details of such skirts can be found in my pending U.S. Pat. No. 4,763,436.

A molded lead head 16, formed to a suitable shape to best present the barb 8 relative to the fishing attitude of the lure is provided forward of the skirt 10. The sidewall 15 of the head 16 is particularly formed to flare conically rearward to an edge of maximum radius 17. A flattened area 19 is provided to support the lure 2 with the barb 8 tipped upward. Thus, upon coming into contact with a lake or river bottom the conical sidewall 15 causes the lure 2 to rotate and right itself at the flattened surface 19.

Exposed from the head 16 is a line attaching eyelet 18. Otherwise, a single member or multi-bristled weed or barb guard 20 projects rearward of the head 16 to protect the barb 8 relative to the possibility of becoming entangled in weeds, brush, or other waterborne obstructions.

Although one particular arrangement of lure components is shown, it is to appreciated still other components may be added or deleted without affecting the invention. For example, additional hooks might be added to the assembly, which are either attached at the eyelet 18 or directly to the hook 4. Live bait or other attractors may also be secured to the hook 4.

Figure 2:
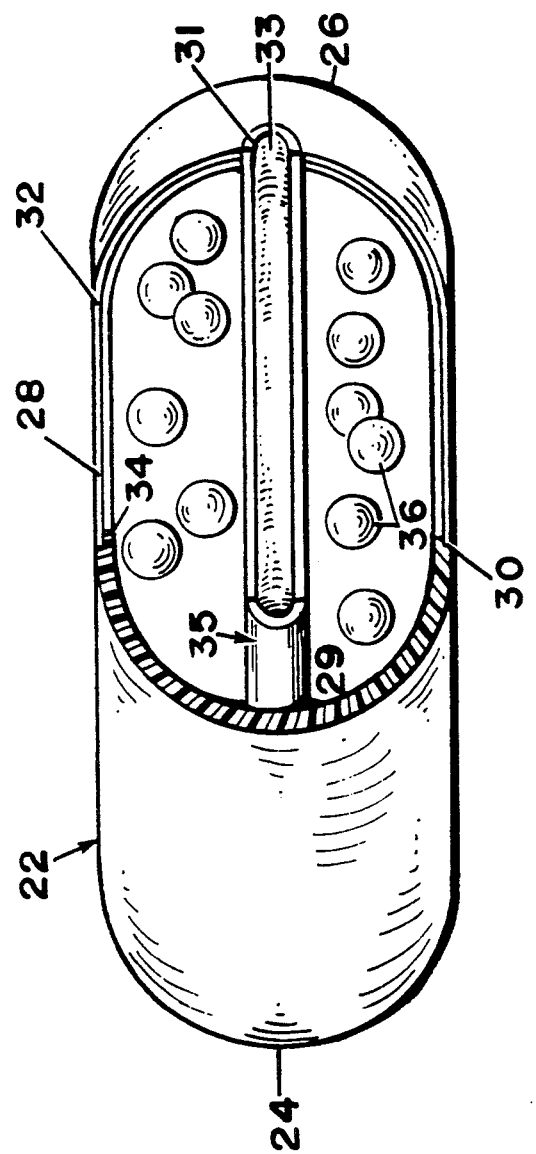
FIG. 2 shows a drawing in partial cutaway of a chamber comprised of mating halves and including a tubular bore having a core which is isolated from the bead-containing cavity.

With attention next to FIG. 2, an exploded assembly drawing is shown of a slightly modified sound chamber 22. The chamber 22, like the chamber 3, is formed of two mating walled housing portions or shell portions 24, 26 which bond to one other along mating peripheral rim portions 28, 30. The rims 28, 30 each include an overlapping or mating vertical flange 34 but may include interlocking bosses, channels or the like to index one shell to the other, depending upon the design of the shells 24, 26. Formed along the center of each shell are matin tubular bore portions 29, 31 which align with each other once the flange 34 are indexed to form a tubular core 35.

Presently, a sonic bonding process is employed to secure the shells 24, 26 to one another and wherein a pair of anvils (not shown) are shaped to mate with the shell portions 24, 26 and vibrate each at a high frequency to the point where sufficient heat is created at the mating rim flanges 34 and tube portions 29, 31 to melt and seal one to the other. Various adhesives or other bonding techniques might also be employed.

In contrast to the above mating peripheral edge construction, the halves 35, 37 of the chamber 3 of FIG. 1 provides flat non-indexing edges. Each half contains a half-circular end bore 32, which when the chamber portions 35, 37 are mated with one another seal abount the shank 6 or other support such as the twisted wire support 34 shown in FIG. 5.

Positioned otherwise internally of each of the chambers 3 or 22 are a plurality of beads 5, 36. The beads typically comprise various lead, steel or other metal or metal coated particles which when the lure or jig 2 is moved in normal use, induce a vibration or audible noise with the chamber walls that attracts fish.

As mentioned and in contrast to the chamber 3, the chamber 22 is formed to include a tubular core 35 formed from bonded core portions 29, 31. The interior of the chamber 22 is thus completely sealed against the entry of water. That is, the beads 36 are captively constrained between the surrounding walls of the outer shell portions 24, 26 and the tubular core portions 29, 31. During normal use, water can only enter the core space 33 of the tube 35 and has no opportunity to accumulate within the interior of the chamber 22 to and lessen the audible sound.

Although Applicant has not experienced the latter problems when the chamber 3 is permanently bonded to hooks in the range of 4/0 to 6/0, this may present a problem for thinner shanked hooks 4 or where the chamber 3 is mounted to slide and rotate about the shank 6 or a thin diameter fishing line snell or twisted wire-form support 34. That is, any space between the bore portions 32 and the hook shank 6 could over time permit water to enter the chamber interior, unless the chamber is alternatively sealed in the fashion of FIG. 2.

Figure 3:
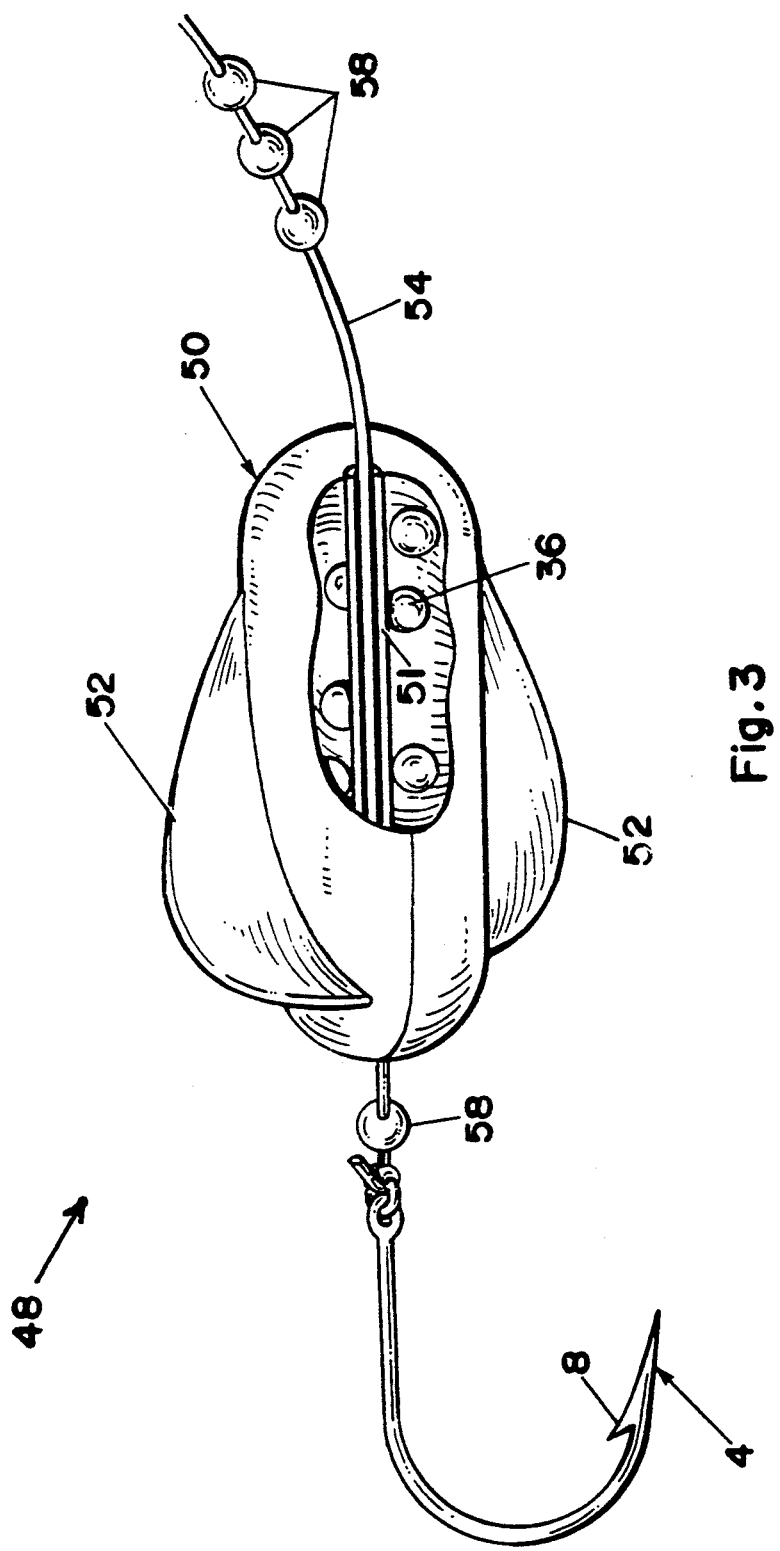
FIG. 3 shows an isometric drawing of a snell mounted chamber including finned projections and wherein the center bore comprises a unitary tube.

In the latter regard and with further attention to FIG. 3, a snell assembly 48 is shown. The assembly 48 provides a sound chamber 50 which includes a tubular bore 51 and finned projections 52. The chamber 50 is otherwise mounted over a terminal length of fishing line 54, commonly referred to as a snell. In passing, it is to be noted that the tubular bore 51 comprises a fixed length of tube stock which is bonded to end bores formed in the chamber walls.

The attractor portion of the assembly 48 principally comprises the chamber 50 which is formed to slide along the line 54, between beads 58 and also rotate. That is, the fins 52 are shaped to induce rotation of the chamber 50 with movement through the water. The fins 52 may provide a slightly concave leading surface or project in spiral relation to the chamber 50 and/or be of a variety of lengths and shapes. They may also include holes to creaste bubbles. While not shown, it is to be appreciated that clevises, spinner blades or other components can be included with the assembly 48.

Although buoyant float members could be used with the assembly 48, they are typically not required. That is, in spite of the inherent weight of the beads 36, Applicant has discovered the chambers 3, 22 and 50 to be relatively buoyant. This apparently occurs with the sealing of the chamber interior and the trapping of air which provides a counter buoyancy to the weight of the beads 36, hooks 4 etc. To further overcome any negative buoyancy, the chamber 50 could also be constructed from various plastics which exhibit either zero or positive buoyancies. Thus, the chambers 3, 22 and 50 can be formed to float, which feature finds particular advantage in the snell assemblies 48.

Figure 4:
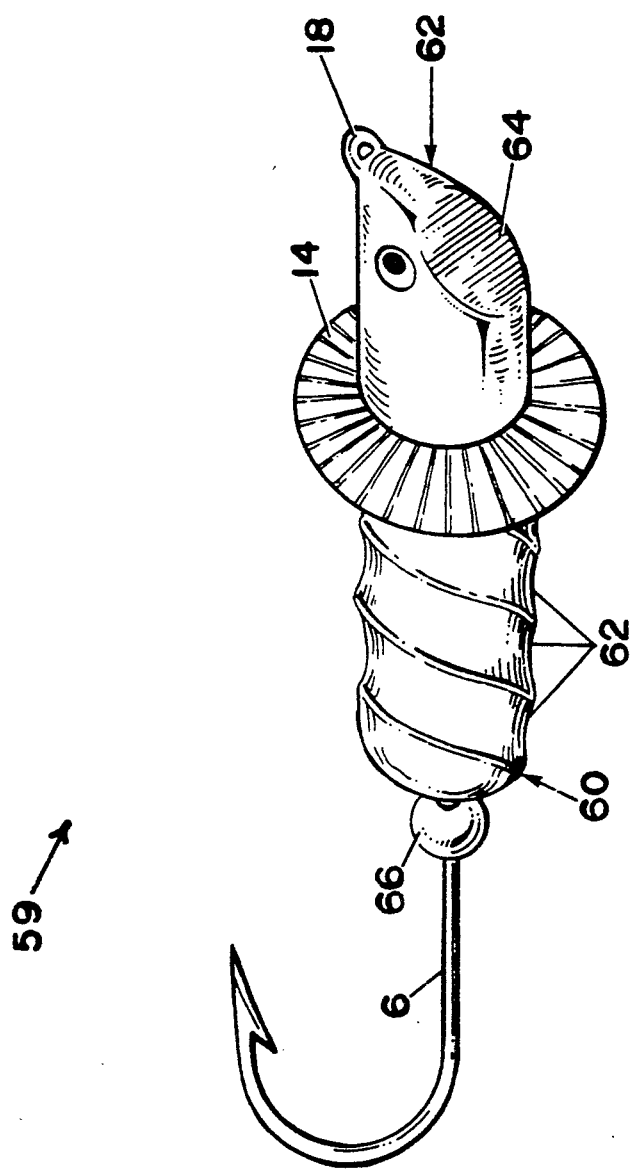
FIG. 4 shows an isometric drawing of a chamber including a symmetrically grooved, rotation inducing surface.

FIG. 4 otherwise shows a jig assembly 59 having a chamber 60 which includes grooves 62 that induce rotation of the chamber 60 as it is drawn through the water. Although symmetrically positioned grooves 60 are shown, the grooves 60 may be non symmetrically positioned and can extend less than the full length of the chamber body. A tubular bore member 35 or 51 is normally used with the chamber 60 to facilitate mounting to the hook 4, yet permit rotation.

The weighted head 62 presents a generally cylindrical configuration, except for a flat portion 64, of lesser diameter than the parachute-like skirt 14. A stop bead 66 is mounted along the hook shrank 6 to facilitate chamber rotation without permitting sliding.

The ability of the present chambers 22, 50 and 60 to rotate provides particular advantage in enhancing the amount of sound produced. With the addition of the external aerodynamic grooves 62 and finned projections 52, exaggerated lure movement is also obtained and which advantages are not otherwise attainable with other conventional unitary bodied lures.

Figure 5:
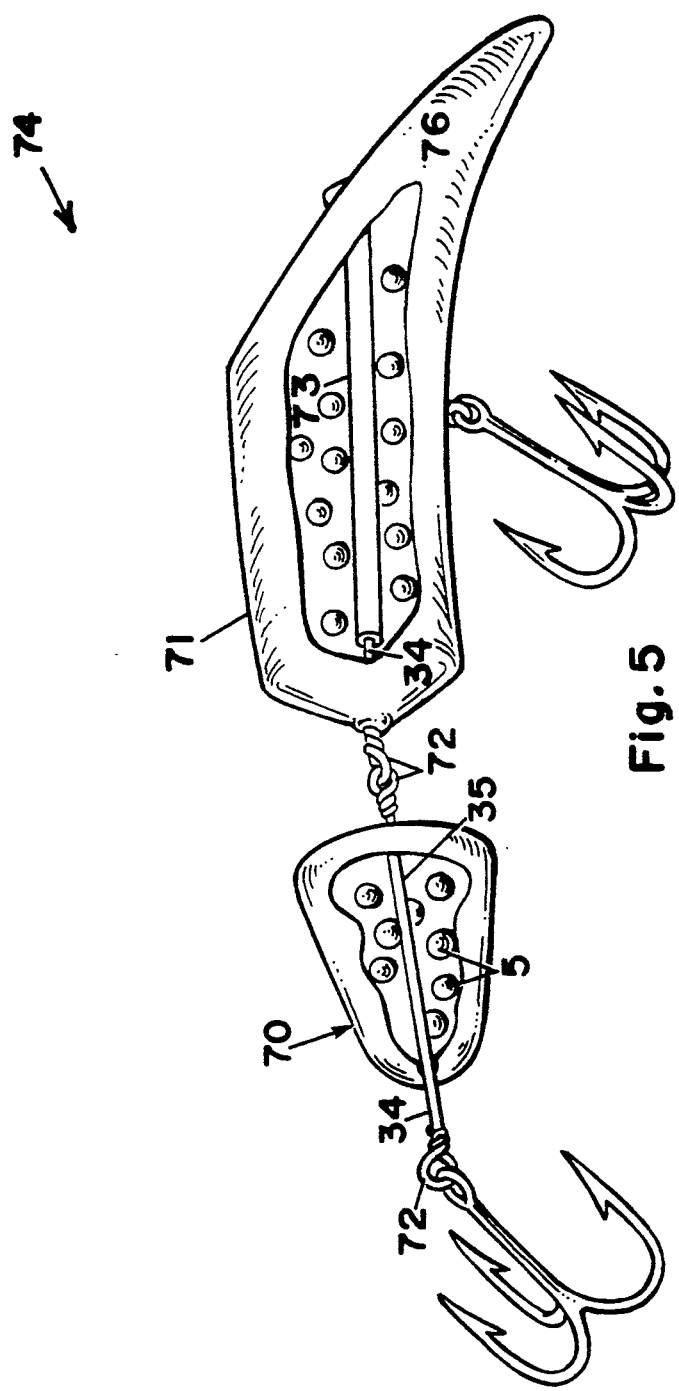
FIG. 5 shows an isometric drawing in partial cutaway of a jointed crank.
Figure 6:
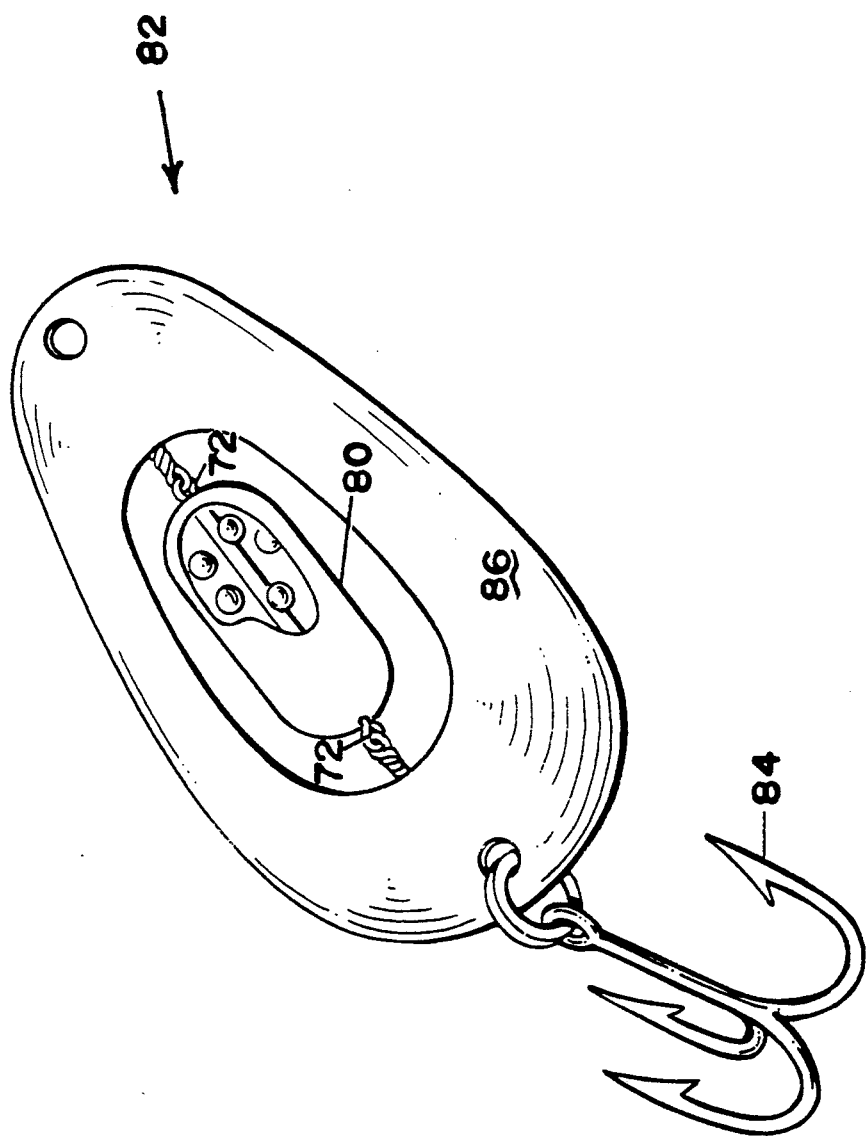
FIG. 6 shows an elevation view of a stamped metal spoon lure.

With further attention directed to FIGS. 5 and 6, chambers 70, 71 and 80 are shown wherein a member wire support 34 is provided. The support 34 includes eyelets 72 at each of the fore and aft ends. Such eyelets 72 are desirable for attaching the chambers to other lure components or to lures which otherwise do not include an audible chamber.

For example, in the lure 74 of FIG. 5, the chambers 70 and 71 form a jointed body. That is, a forward audible body section 71 is followed by a second audible chamber 70. The sections 70, 71 are secured to one another at mating eyelets 72. For the sake of depicting alternative mounting arrangements, the wire-form support 34 of the chamber 70 mounts through end bores. The wire-form 34 of the chamber 71 otherwise mounts inside a tubular bore member 73 which is shown in cutaway. It is to be further appreciated that the chamber shapes can be adjusted depending upon a desired overall lure configuration and may even include a split bore member 35. One or more solid body portions may also be used with one or more audible chambers 70, 71.

FIG. 6 depicts a stamp formed metallic spoon-type lure 82 which includes a trailing treble hook 84. Mounted within the plane of the lure body 86 is the chamber 80, which includes a bore member of either of the constructions 35 or 51 and a contained wire-form support 34.

The chamber 80 is attached to body 86 at the eyelets 72 of the twisted wire support 34 and bent tangs 88. The tangs 88 are stamped as part of the lure body 86 and are bent to capture the eyelets 72. Depending upon the body shape, which is formed to typically provide an oscillatory or fluttering lure motion, the chamber 80 can slide and/or rotate on the wire-form support 34.

While the present invention has been described with respect to its presently preferred construction and variously considered modifications thereto, it is to be appreciated still other modifications may suggest themselves to those of skill in the art. Accordingly, the following claims should be interpreted to include all those equivalent embodiments within the spirit and scope thereof.

What is claimed is:

1. Fishing lure apparatus comprising:
    (a) first and second walled housing portions having mating peripheral edges which edges seal to one another to define a housing and a hollow internal cavity;
    (b) a plurality of beads loosely confined within said cavity to produce audible sounds upon randomly striking the housing walls; and
    (c) means for defining a bore through the housing walls and wherethrough the shank of a fish hook extends, wherein said hook includes a weighted head molded about a hook eye and wherein said housing is mounted to the shank to permit movement of the housing longitudinally and rotationally along the shank.

2. Apparatus as set forth in claim 1 wherein said head conically projects rearward from a vertex at the hook eye and includes a flattened surface portion, wherein said flattened surface and head are formed relative to the hook shank and a barb to cause said head to self-right upon said flattened surface and thereby induce the barb and shank to acutely project thereabove when said head is in contact with a lake or stream bottom.

3. Apparatus as set forth in claim 1 including a solid bodied skirt mounted aft of said head and radially projecting from the hook shank beyond the spacing between a hook barb and the hook shank and wherein the longitudinal thickness of said skirt is such that the skirt collapses and expands relative to the hook shank with lure motion through the water.

4. Apparatus as set forth in claim 1 wherein said bore defining means comprises a tubular member which concentrically extends between opposite fore and aft end walls of said housing along a longitudinal center axis and being sealed to the housing end walls such that said cavity is water tight and wherein said support member mounts within a through bore of said tubular member.

5. Apparatus as set forth in claim 4 wherein said tubular member comprises first and second longitudinal portions of the respective first and second walled housing portions which coaxially extend along the longitudinal center axis and include mating peripheral edges which edges when sealed to one another isolate a formed hollow bore from the cavity.

6. Apparatus as set forth in claim 4 wherein the mating peripheral edges of said first and second walled housing portions include overlapping vertical flanges which project therefrom and mount in indexable relation to one another.

7. Apparatus as set forth in claim 4 wherein the shank of the fish hook includes means for limiting longitudinal movement of the housing along the shank and said housing includes means for rotating the housing about the shank with movement of the apparatus through water.

8. Apparatus as set forth in claim 7 wherein said housing includes at least one fin projecting from an exterior surface thereof to induce rotation of said housing upon directing said housing through water.

9. Apparatus as set forth in claim 7 wherein an exterior surface of said housing includes a plurality of grooves which induce rotation of said housing upon being drawn through water.

10. Apparatus as set forth in claim 1 wherein said housing is formed of a neutral to positively buoyant material.

11. Apparatus as set forth in claim 1 wherein said beads are metallic beads and the buoyancy of the housing is positive.

12. Fishing lure apparatus comprising:
    (a) first and second walled housing portions having mating peripheral edges which edges seal to one another to define a housing and a hollow internal cavity;
    (b) a plurality of beads loosely confined within said cavity to produce audible sounds upon randomly striking the housing walls;
    (c) bore defining means extending through the housing walls for supporting said housing relative to the shank of a fish hook, wherein said hook includes a weighted head molded about a hook eye and wherein said head conically projects rearward from a vertex at the hook eye and includes a flattened surface portion, said flattened surface and head being formed relative to the hook shank and a barb to cause said head to self-right onto the flattened surface and the barb and shank to acutely project thereabove when said head is in contact with a lake or stream bottom.

13. Apparatus as set forth in claim 12 wherein said bore defining means comprises a tubular member concentrically extending between opposite fore and aft end walls of said housing along a longitudinal center axis and walls of said housing along a longitudinal center axis and being sealed to said housing and end walls such that said cavity is water tight and wherein said shank mounts within a through core of said tubular member.

14. Fishing lure apparatus comprising:
    (a) a flattened metal body including at least one aperture;
    (b) means for attaching a fishing line and at least one fish hook to said body;
    (c) first and second walled housing portions having mating peripheral edges which edges seal to one another to define a housing and a hollow internal cavity;
    (d) a plurality of beads loosely confined within said cavity to produce audible sounds upon randomly striking the housing walls;
    (e) means for defining a bore through the housing walls and wherethrough a support member extends and about which support said housing is moveable; and
    (f) means for restraining said support member within the aperture of the metal body and whereby the housing moves in coplanar relation to the body with movement of the apparatus through water.

15. Fishing lure apparatus comprising:
    (a) first and second walled housing portions having mating peripheral edges which edges seal to one another to define a housing and a hollow internal cavity;
    (b) a plurality of beads loosely confined within said cavity to produce audible sounds upon randomly striking the housing walls;
    (c) means for defining a bore through the housing walls and through which bore the shank of a fish hook extends;
    (d) means for limiting longitudinal movement of the housing along the shank; and
    (e) means for rotating the housing in position about the shank with movement of the apparatus through water.

* * * * *